(12) United States Patent
Kim (10) Patent No.: US 8,238,446 B2
(45) Date of Patent: Aug. 7, 2012

(54) METHOD AND APPARATUS FOR REPRODUCING DIGITAL BROADCASTING

(75) Inventor: Chin-youl Kim, Incheon Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1412 days.

(21) Appl. No.: 11/777,421

(22) Filed: Jul. 13, 2007

(65) Prior Publication Data

US 2008/0198921 A1 Aug. 21, 2008

(30) Foreign Application Priority Data

Feb. 15, 2007 (KR) .................. 10-2007-0016118

(51) Int. Cl.
*H04N 11/02* (2006.01)
(52) U.S. Cl. ......... 375/240.28; 375/240.13; 375/240.25; 348/512; 348/513; 348/564; 348/500; 370/509; 370/503; 370/512; 386/201
(58) Field of Classification Search .................. None
See application file for complete search history.

(56) References Cited

U.S. PATENT DOCUMENTS

| 5,771,075 A * | 6/1998 | Rim et al. ................ 348/512 |
| 6,253,025 B1 * | 6/2001 | Kitamura et al. ........... 386/351 |
| 6,512,552 B1 * | 1/2003 | Subramanian ............. 348/564 |
| 7,130,316 B2 * | 10/2006 | Kovacevic ................ 370/509 |
| 2002/0196847 A1 * | 12/2002 | Kim .................... 375/240.2 |
| 2003/0095600 A1 * | 5/2003 | Tsukagoshi ............. 375/240.13 |
| 2004/0190628 A1 * | 9/2004 | Murayama ............. 375/240.25 |
| 2011/0289538 A1 * | 11/2011 | Begen et al. ................ 725/107 |

FOREIGN PATENT DOCUMENTS

| KR | 2003-0080377 A | 10/2003 |
| KR | 1020040010961 A | 2/2004 |
| KR | 1020060061254 A | 6/2006 |
| KR | 1020060087966 A | 8/2006 |

OTHER PUBLICATIONS

Korean Office Action issued on Mar. 14, 2011 in the corresponding Korean Patent Application No. 10-2007-0016118.
Communication issued on Feb. 1, 2012 by the Korean Intellectual Property Office in the corresponding Korean Patent Application No. 10-2007-0016118.

* cited by examiner

Primary Examiner — Syed A. Zia
(74) Attorney, Agent, or Firm — Sughrue Mion, PLLC (57) ABSTRACT

Provided are a method and apparatus for reproducing digital broadcasting. The method includes parsing an input video stream to extract a presentation time stamp (PTS) and a compressed frame and decoding the extracted compressed frame to generate frames sequentially. If a PTS corresponding to a current frame does not exist, a virtual PTS is generated based on the extracted PTS The extracted PTS or the virtual PTS is compared with a system time clock (STC) in synchronization with a vertical synchronization signal and an output time of a display frame is determined.

24 Claims, 4 Drawing Sheets

METHOD AND APPARATUS FOR REPRODUCING DIGITAL BROADCASTING

CROSS-REFERENCE TO RELATED PATENT APPLICATION

This application claims priority from Korean Patent Application No. 10-2007-0016118, filed on Feb. 15, 2007, in the Korean Intellectual Property Office, the disclosure of which is incorporated herein in its entirety by reference.

BACKGROUND OF THE INVENTION

1. Field of the Invention

The present invention relates to a digital broadcasting system, and more particularly, to a method and apparatus for reproducing digital broadcasting.

2. Description of the Related Art

In current digital video broadcasting systems, analog audio and video signals are converted into a digital signal to be transmitted and the transmitted signal is received in a receiver to be converted again into analog signals. In this case, in order to transmit more digital data to a given channel capacity, the digital audio and video data are respectively compressed by a compression algorithm to be transmitted in the form of a bitstream. In the receiver, the compressed digital data is decompressed so as to restore the data to the original digital audio and video data.

In general, with digitalization, image compression technology is used as a main element to support multimedia. Among the image compression technology, Moving Picture Expert Group-2 (MPEG-2) is an international standard for compression decoding of digital moving pictures, the compression decoding being the main technology in a multimedia environment.

When an audio/video multi bitstream is input to a digital broadcasting receiver employing MPEG-2, the digital broadcasting receiver separates audio data and video data from a transport demultiplexer. The separated video data and audio data are respectively input to a video decoder and an audio decoder generally in the form of a packetized elementary stream (PES).

Since the digital broadcasting receiver uses a digital signal, unlike analog systems, additional A/V lip-synchronization is needed to synchronize a video signal with an audio signal. A general A/V lip-synchronization is formed by using a presentation time stamp (PTS) and a system time clock (STC) given each time video data and audio data are decoded and reproduced.

More specifically, an audio decoder and a video decoder include the PTS that corresponds to each frame and thus the PTS is compared with the STC of the same system, thereby controlling A/V lip-synchronization. If the PTS is in a specific range set previously based on the STC, A/V lip-synchronization is determined to be correct and a normal decoding is performed to output A/V data. However, if the PTS is not in a specific range set previously based on the STC, decoding is skipped or A/V lip-synchronization is corrected through repeating or waiting.

As described above, if the PTS that corresponds to each frame of audio data and video data exists, AV lip-synchronization can be well accomplished. However, if the PTS that corresponds to each frame of audio and video does not exist, the time to display the corresponding frames may be inaccurate since there is no PTS that can be compared with the STC and thus AV lip-synchronization may not be accomplished well.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

A method of reproducing digital broadcasting in which AV lip-synchronization is possible even when a PTS that corresponds to a current frame does not exist is provided.

An apparatus for reproducing digital broadcasting in which AV lip-synchronization is possible even when a PTS that corresponds to a current frame does not exist is also provided.

According to an aspect of the present invention, there is provided a method of reproducing digital broadcasting including: parsing an input video stream to extract a PTS and a compressed frame, and decoding the extracted compressed frame to generate frames sequentially; if a PTS corresponding to a current frame does not exist, generating a virtual PTS based on the extracted PTS; and comparing the extracted PTS or the virtual PTS with an STC in synchronization with a vertical synchronization signal and determining an output time of a display frame.

The generating of the virtual PTS may include adding a time corresponding to one frame interval to the PTS corresponding to a previous display frame.

The determining of the output time of the display frame may include comparing the STC with the PTS in synchronization with the vertical synchronization signal, if the PTS corresponding to the current frame exists.

The determining of the output time of the display frame further include: if the difference between the STC and the PTS is smaller than the time corresponding to one frame interval, displaying a frame that corresponds to the PTS; if the difference between the STC and the PTS is larger than the time corresponding to one frame interval, repeatedly displaying a previous frame when the STC is smaller than the PTS; and if the difference between the STC and the PTS is larger than the time corresponding to one frame interval, skipping the frame that corresponds to the PTS and displaying a next frame when the STC is larger than the PTS.

The determining of the output time of the display frame may include comparing the STC with the virtual PTS in synchronization with the vertical synchronization signal, if the PTS corresponding to the current frame does not exist.

The determining of the output time of the display frame may further include: if the difference between the STC and the virtual PTS is smaller than the time corresponding to one frame interval, displaying a frame that corresponds to the virtual PTS; if the difference between the STC and the virtual PTS is larger than the time corresponding to one frame interval, repeatedly displaying a previous frame when the STC is smaller than the virtual PTS; and if the difference between the STC and the virtual PTS is larger than the time corresponding to one frame interval, skipping the frame that corresponds to the virtual PTS and displaying a next frame when the STC is larger than the virtual PTS.

The frame may be synchronized with an audio frame to be displayed.

The input video stream may include packetized elementary stream (PES) packets, the PTS exists in a header of the PES packet, and the compressed frame exists in an elementary stream (ES) of the PES packet.

According to another aspect of the present invention, there is provided a computer readable recording medium having embodied thereon a computer program for executing the method including: parsing an input video stream to extract a PTS and a compressed frame, and decoding the extracted compressed frame to generate frames sequentially; if a PTS corresponding to a current frame does not exist, generating a virtual PTS based on the extracted PTS; and comparing the extracted PTS or the virtual PTS with an STC in synchronization with a vertical synchronization signal and determining an output time of a display frame.

According to another aspect of the present invention, there is provided an apparatus for reproducing digital broadcasting including: a parser which parses an input video stream and extracts a PTS and a compressed frame; a decoder which decodes the extracted compressed frame and generates frames sequentially; and a controlling unit which generates a virtual PTS based on the extracted PTS, if a PTS corresponding to a current frame does not exist, and compares the extracted PTS or the virtual PTS with an STC in synchronization with a vertical synchronization signal to determine an output time of a display frame.

The apparatus for reproducing digital broadcasting may further include a storing unit which stores the frame, the extracted PTS, and the virtual PTS.

The controlling unit may generate the virtual PTS by adding a time corresponding to one frame interval to the PTS corresponding to a previous display frame.

The controlling unit may compare the STC with the PTS in synchronization with the vertical synchronization signal, if the PTS corresponding to the current frame exists.

The controlling unit may display a frame that corresponds to the PTS if the difference between the STC and the PTS is smaller than the time corresponding to one frame interval, repeatedly display a previous frame if the difference between the STC and the PTS is larger than the time corresponding to one frame interval when the STC is smaller than the PTS, and skip the frame that corresponds to the PTS and displays a next frame if the difference between the STC and the PTS is larger than the time corresponding to one frame interval when the STC is larger than the PTS.

The controlling unit may compare the STC with the virtual PTS in synchronization with the vertical synchronization signal, if the PTS corresponding to the current frame does not exist.

The controlling unit may display a frame that corresponds to the virtual PTS if the difference between the STC and the virtual PTS is smaller than the time corresponding to one frame interval, repeatedly display a previous frame if the difference between the STC and the virtual PTS is larger than the time corresponding to one frame interval when the STC is smaller than the virtual PTS, and skip the frame that corresponds to the virtual PTS and displays a next frame if the difference between the STC and the virtual PTS is larger than the time corresponding to one frame interval when the STC is larger than the virtual PTS.

According to another aspect of the present invention, there is provided a method of reproducing digital broadcasting including: parsing an input stream to extract a PTS and a compressed frame and decoding the extracted compressed frame to generate frames sequentially; if a PTS corresponding to a current frame does not exist, generating a virtual PTS based on other extracted PTSs; and comparing the extracted PTS or the virtual PTS with an STC in synchronization with a vertical synchronization signal and determining an output time of a display frame.

The input stream may be one of a video stream and an audio stream.

According to another aspect of the present invention, there is provided a computer readable recording medium having embodied thereon a computer program for executing the method including: parsing an input stream to extract a PTS and a compressed frame and decoding the extracted compressed frame to generate frames sequentially; if a PTS corresponding to a current frame does not exist, generating a virtual PTS based on other extracted PTSs; and comparing the extracted PTS or the virtual PTS with an STC in synchronization with a vertical synchronization signal and determining an output time of a display frame.

According to another aspect of the present invention, there is provided an apparatus for reproducing digital broadcasting including: a demultiplexer which demultiplexes an input transport stream and outputs an audio stream and a video stream; an audio decoding unit which parses the audio stream to extract an audio PTS and a compressed audio frame and decodes the extracted compressed audio frame to generate audio frames sequentially; a video decoding unit which parses the video stream to extract a video PTS and a compressed video frame and decodes the extracted compressed video frame to generate video frames sequentially; an audio controlling unit which generates a virtual audio PTS based on extracted audio PTSs, if an audio PTS corresponding to a current audio frame does not exist, and compares the extracted audio PTS or the virtual audio PTS with an STC in synchronization with a vertical synchronization signal to determine an output time of an output audio frame; and a video controlling unit which generates a virtual video PTS based on extracted video PTSs, if a video PTS corresponding to a current a video frame does not exist, and compares the extracted video PTS or the virtual video PTS with the STC in synchronization with the vertical synchronization signal to determine an output time of an output video frame.

The apparatus for reproducing digital broadcasting may further include an audio storing unit which stores the audio frame, the extracted audio PTS, and the virtual audio PTS; and a video storing unit which stores the video frame, the extracted video PTS, and the virtual video PTS.

The audio controlling unit may generate the virtual audio PTS by adding a time corresponding to one audio frame interval to the audio PTS corresponding to a previous output audio frame and the video controlling unit generates the virtual video PTS by adding a time corresponding to one video frame interval to the video PTS corresponding to a previous output video frame.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS

Hereinafter, the present invention will be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, like reference numerals denote like elements, and the sizes and thicknesses of layers and regions are exaggerated for clarity. Also, the terms used herein are defined according to the functions of the present invention. Thus, the terms may vary depending on users or operators and usages. That is, the terms used herein must be understood based on the descriptions made herein.

Figure 1:
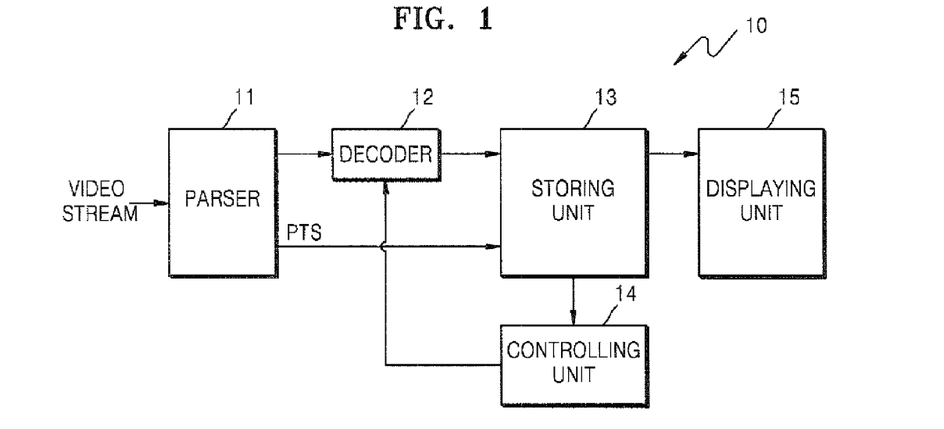
FIG. 1 is a block diagram of an apparatus for reproducing digital broadcasting according to an exemplary embodiment of the present invention.

FIG. 1 is a block diagram of an apparatus for reproducing digital broadcasting according to an exemplary embodiment of the present invention.

Referring to FIG. 1, the apparatus for reproducing digital broadcasting 10 includes a parser 11, a decoder 12, a storing unit 13, a controlling unit 14, and a displaying unit 15.

The parser 11 parses an input video stream and extracts a PTS and a compressed frame. The extracted PTS is provided to the storing unit 13 and the extracted compressed frame is provided to the decoder 12.

The decoder 12 decodes an ES that corresponds to the extracted compressed frame received from the parser 11 to generate sequential frames and provides the frames to the storing unit 13.

The storing unit 13 stores the PTS provided by the parser 11 and the frames provided by the decoder 12 and provides the stored frames to the displaying unit 15.

The controlling unit compares the PTS provided by the storing unit 13 with an STC) to determine the output time of a display frame and controls the decoder 12.

If the PTS that corresponds to the current frame does not exist, the controlling unit 14 generates a virtual PTS based on the extracted PTS and compares the PTS or the virtual PTS with the STC, thereby determining the output time of the display frame.

The displaying unit 15 displays the frame provided from the storing unit 13.

Figure 2:
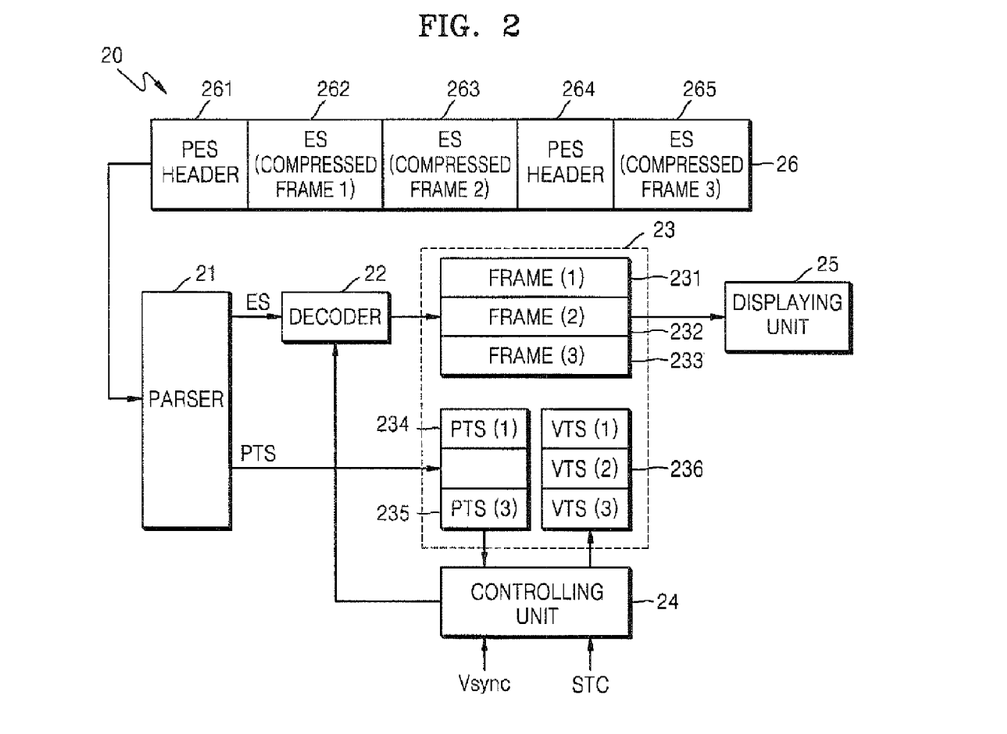
FIG. 2 is a block diagram of an apparatus for reproducing digital broadcasting illustrated in more detail according to an exemplary embodiment of the present invention.

FIG. 2 is a block diagram of an apparatus for reproducing digital broadcasting illustrated in more detail according to an exemplary embodiment of the present invention.

Referring to FIG. 2, the apparatus for reproducing digital broadcasting 20 includes a parser 21, a decoder 22, a storing unit 23, a controlling unit 24, and a displaying unit 25.

The parser 21 receives and parses video stream 26. The video stream 26 is structured in the form of PES packets in which a transport stream is demultiplexed by being passed through a demultiplexer (not illustrated).

The video stream 26, that is one of the PES packets, is formed of first and second PES headers 261 and 264 and first through third ESs 262, 263, and 265. The first and second PES headers 261 and 264 respectively include the PTS and the first through third ESs 262, 263, and 265 can respectively correspond to compressed frames. In addition, according to an exemplary embodiment, each of the ESs can correspond to at least one compressed frame.

The PES packet in FIG. 2 includes two PES headers and three ESs. However, this is only for ease of description and the PES packet can include a plurality PES headers and a plurality of ESs according to an exemplary embodiment and this is well known to one of ordinary skill in the art.

The first PES header 261 includes a first PTS and the first PTS has information on the reproducing time for the compressed frame included in the first ES 262. The second PES header 264 has information on the reproducing time for the compressed frame included in the third ES 265. However, a PES header that corresponds to the second ES 263 does not exist and thus a PTS that corresponds to the second ES 263 does not exist.

More specifically, the parser 21 receives the video stream 26, that is, the PES packet, and extracts the first and second PTSs from the first and second PES headers 261 and 264, thereby providing the first and second PTSs to the storing unit 23. In addition, the parser 21 eliminates the first and second PES headers 261 and 264 from the video stream 26 so that the compressed frames are extracted from the first through third ESs 262, 263, and 265. The extracted compressed frames are provided to the decoder 22.

The decoder 22 decodes the compressed frames extracted from the first through third ESs 262, 263, and 265 provided by the parser 21 and generates first through third frames 231, 232, and 233 sequentially. In addition, the decoder 22 is controlled and operated by the controlling unit 24. This will be described later.

The storing unit 23 stores first and second PTSs 234 and 235 provided and extracted from the parser 21 and the first through third frames 231, 232, and 233.

The controlling unit receives a vertical synchronization signal Vsync, an STC, and the first and second PTSs 234 and 235. The controlling unit 24 compares the STC and the first and second PTSs 234 and 235 according to the vertical synchronization signal Vsync and determines the output time of the display frame, thereby controlling the decoder 22. For example, the vertical synchronization signal Vsync may be 60 Hz. In this case, the controlling unit 24 can compare the STC and the first and second PTSs 234 and 235 60 times in a second.

More specifically, the controlling unit 24 compares a smaller value from among the first and second PTSs 234 and 235 with the STC and determines the output time of the display frame.

For example, if the first PTS 234 is smaller than the second PTS 235, the controlling unit 24 compares the first PTS 234 with the STC according to the vertical synchronization signal Vsync and determines the output time of the display frame.

If the difference between the STC and the first PTS 234 is smaller than the time T corresponding to one frame interval (|STC−first PTS|<T), the controlling unit 24 controls the decoder 22 to display the frame corresponding to the first PTS 234. In addition, if the difference between the STC and the first PTS 234 is larger than the time T corresponding to one frame interval (|STC−first PTS|>T), the controlling unit 24 controls the decoder 22 to repeatedly display a previous frame when the STC is smaller than the first PTS 234 (STC<first PTS). In addition, if the difference between the STC and the first PTS 234 is larger than the time T corresponding to one frame interval (|STC−first PTS|>T), the controlling unit 24 controls the decoder 22 to skip the frame corresponding to the first PTS 234 and display a next frame when the STC is larger than the first PTS 234 (STC>first PTS).

However, since the PES that corresponds to the second compressed frame 263 does not exist, the PTS that corresponds to the second frame 232 does not exist. In this case, the controlling unit 24 cannot determine when to display the second frame 232 and thus AV lip-synchronization may not be accomplished.

In order to solve this, the controlling unit 24 according to an exemplary embodiment of the present invention generates a virtual PTS (VTS) based on the first and second PTSs 234 and 235 and controls the decoder 22. More specifically, the controlling unit 24 adds the time corresponding to one frame interval to the PTS corresponding to the previous display frame to generate the VTS.

For example, if the previous display frame is the first frame 231, the time corresponding to one frame interval is added to the first PTS 234 and the VTS can be generated. The VTS 236 generated as above can be stored in the storing unit 23.

The controlling unit 24 compares the VTS 236 corresponding to the second frame 232 with the STC according to the vertical synchronization signal Vsync and controls the decoder 22.

More specifically, if the difference between the STC and the exemplary 236 is smaller than the time T corresponding to one frame interval (|STC−VTS|<T), the controlling unit 24 controls the decoder 22 to display the frame corresponding to the VTS 236. In addition, if the difference between the STC and the VTS 236 is larger than the time T corresponding to one frame interval (|STC−VTS|>T), the controlling unit 24 controls the decoder 22 to repeatedly display a previous frame when the STC is smaller than the VTS 236 (STC<VTS). Also, if the difference between the STC and the VTS 236 is larger than the time T corresponding to one frame interval (|STC−VTS|>T), the controlling unit 24 controls the decoder 22 to skip the frame corresponding to the VTS 236 and display a next frame when the STC is larger than the VTS 236 (STC>VTS).

The displaying unit 25 receives the first through third frames 231, 232, and 233 from the storing unit 23 and displays the frames. For example, the displaying unit may be a digital television (DTV).

Figure 3:
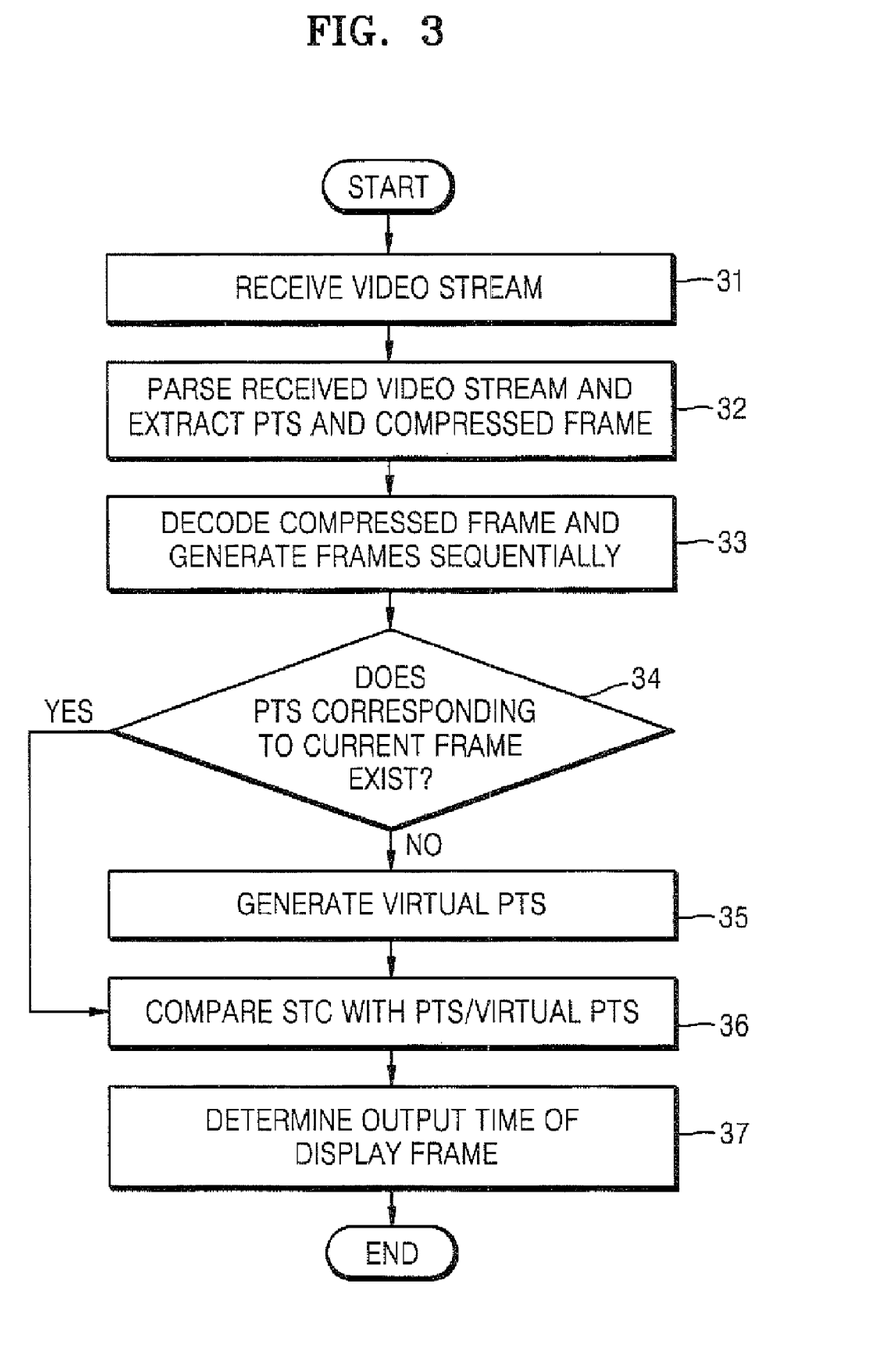
FIG. 3 is a flowchart illustrating a method of reproducing digital broadcasting according to an exemplary embodiment of the present invention.

FIG. 3 is a flowchart illustrating a method of reproducing digital broadcasting according to an exemplary embodiment of the present invention.

Referring to FIG. 3, the method of reproducing digital broadcasting includes receiving a video stream as illustrated in operation 31. The video stream is structured in the form of PES packets in which a transport stream is demultiplexed by being passed through a demultiplexer (not illustrated).

In operation 32, the received video stream is parsed and a PTS and a compressed frame are extracted. More specifically, the PTS is extracted from the video stream, that is, from a header of the PES packet, and the compressed frame is extracted from an ES where the header is removed from the PES packet.

In operation 33, the compressed frame is decoded to generate sequential frames.

In operation 34, whether a PTS corresponding to the current frame exists is determined.

If the PTS corresponding to the current frame does not exist, a virtual PTS is generated based on other extracted PTSs in operation 35. More specifically, the time corresponding to one frame interval is added to the PTS corresponding to the previous display frame to generate the virtual PTS.

An STC is compared with the PTS or the VTS in synchronization with a vertical synchronization signal in operation 36. More specifically, if a PTS corresponding to the current frame exists, the STC is compared with the PTS according to a vertical synchronization signal and if the PTS corresponding to the current frame does not exist, the STC is compared with the VTS according to a vertical synchronization signal.

According to the comparison result, the output time of the display frame is determined in operation 37. More specifically, if the difference between the STC and the PTS or the VTS is smaller than the time T corresponding to one frame interval after comparing the STC with the PTS or the VTS according to the vertical synchronization signal, the frame is displayed normally. If the difference between the STC and the PTS or the VTS is larger than the time T corresponding to one frame interval, one frame is repeatedly displayed when the STC is smaller than the PTS or the VTS and one frame is skipped and another one is displayed when the STC is larger than the PTS or the VTS.

Figure 4:
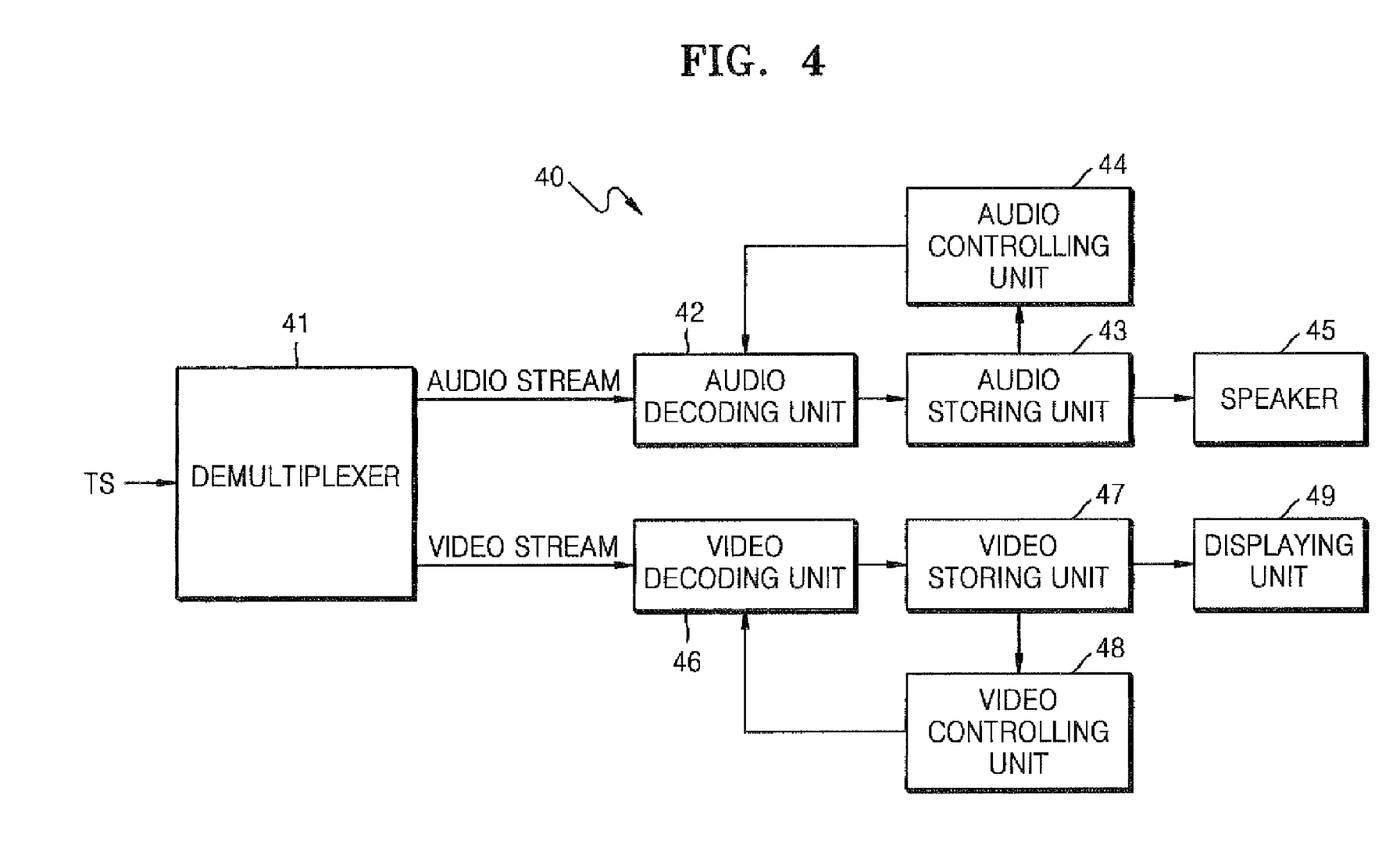
FIG. 4 is a block diagram of an apparatus for reproducing digital broadcasting according to another exemplary embodiment of the present invention.

FIG. 4 is a block diagram of an apparatus for reproducing digital broadcasting according to another exemplary embodiment of the present invention.

Referring to FIG. 4, the apparatus for reproducing digital broadcasting 40 includes a demultiplexer 41, an audio decoding unit 42, an audio storing unit 43, an audio controlling unit 44, a speaker 45, a video decoding unit 46, a video storing unit 47, a video controlling unit 48, and a displaying unit 49.

The demultiplexer 41 demultiplexes a transport stream TS received from a broadcasting station to output an audio stream and a video stream and provides the audio stream and the video stream to the audio decoding unit 42 and the video decoding unit 46, respectively. The audio and video streams may be structured in the form of PES packets and each PES packet may be formed of a PES header and an ES.

The audio decoding unit 42 parses the audio stream received from the demultiplexer 41 to extract an audio PTS and a compressed audio frame and decodes the extracted compressed audio frame to generate sequential audio frames. The audio decoding unit 42 provides the extracted audio PTS and the generated audio frames to the audio storing unit 43.

The audio storing unit 43 stores the audio frame and the audio PTS provided from the audio decoding unit 42.

If the audio PTS that corresponds to the current audio frame does not exist, the audio controlling unit 44 generates a virtual audio PTS based on the extracted audio PTS and compares the extracted audio PTS or the virtual audio PTS with the STC according to a vertical synchronization signal to determine the output time of the audio frame that is to be output, thereby controlling the audio decoding unit 42. The generated virtual audio PTS can be stored in the audio storing unit 43.

The speaker 45 outputs the audio frame stored in the audio storing unit 43.

The video decoding unit 46 parses the received video stream to extract a video PTS and a compressed video frame and decodes the compressed video frame to generate sequential video frames. The video decoding unit 46 provides the extracted video PTS and generated video frame to the video storing unit 47.

The video storing unit 47 stores the video frame and the video PTS provided from the video decoding unit 46.

If the video PTS that corresponds to the current video frame does not exist, the video controlling unit 48 generates a virtual video PTS based on the extracted video PTS and compares the extracted video PTS or the virtual video PTS with the STC according to a vertical synchronization signal to determine the output time of the video frame that is to be output, thereby controlling the video decoding unit 46. The generated virtual video PTS can be stored in the video storing unit 47.

The displaying unit 49 outputs the video frame stored in the video storing unit 47.

Hereinafter, an AV lip-synchronization operation of the apparatus for reproducing digital broadcasting 40 will be described.

If the video PTS that corresponds to the video frame and the audio PTS that corresponds to the audio frame normally exist, the video PTS and the audio PTS are respectively compared with the same STC so that the video frame corresponding to the video PTS that corresponds to the STC is output to the displaying unit 49 and the audio frame corresponding to the audio PTS that corresponds to the STC is output to the speaker, thereby performing AV lip-synchronization.

However, if any one of the video PTS corresponding to the current video frame and the audio PTS corresponding to the current audio frame does not exist, the audio controlling unit 44 or the video controlling unit 48 generates a virtual video PTS or a virtual audio PTS and respectively compares the virtual video PTS or the virtual audio PTS with the STC.

For example, if the audio PTS corresponding to the current audio frame normally exists but if the video PTS corresponding to the current video frame does not exist, the video controlling unit 48 generates the virtual video PTS. The audio controlling unit 44 compares the audio PTS with the STC and the video controlling unit 48 compares the virtual video PTS with the STC. If the STC and the virtual video PTS correspond to each other, the corresponding video frame is output to the displaying unit 49 and the audio frame corresponding to the audio PTS that corresponds to the STC is output to the speaker 45, thereby performing AV lip-synchronization.

Similarly, if the video PTS corresponding to the current video frame normally exists but the audio PTS corresponding to the current audio frame does not exist, the audio controlling unit 44 generates a virtual audio PTS. The video controlling unit 48 compares the video PTS with the STC and the audio controlling unit 44 compares the virtual audio PTS with the STC. If the STC and the virtual audio PTS correspond to each other, the corresponding audio frame is output to the speaker 45 and the video frame corresponding to the video PTS that corresponds to the STC is output to the displaying unit 49, thereby performing AV lip-synchronization.

Figure 5:
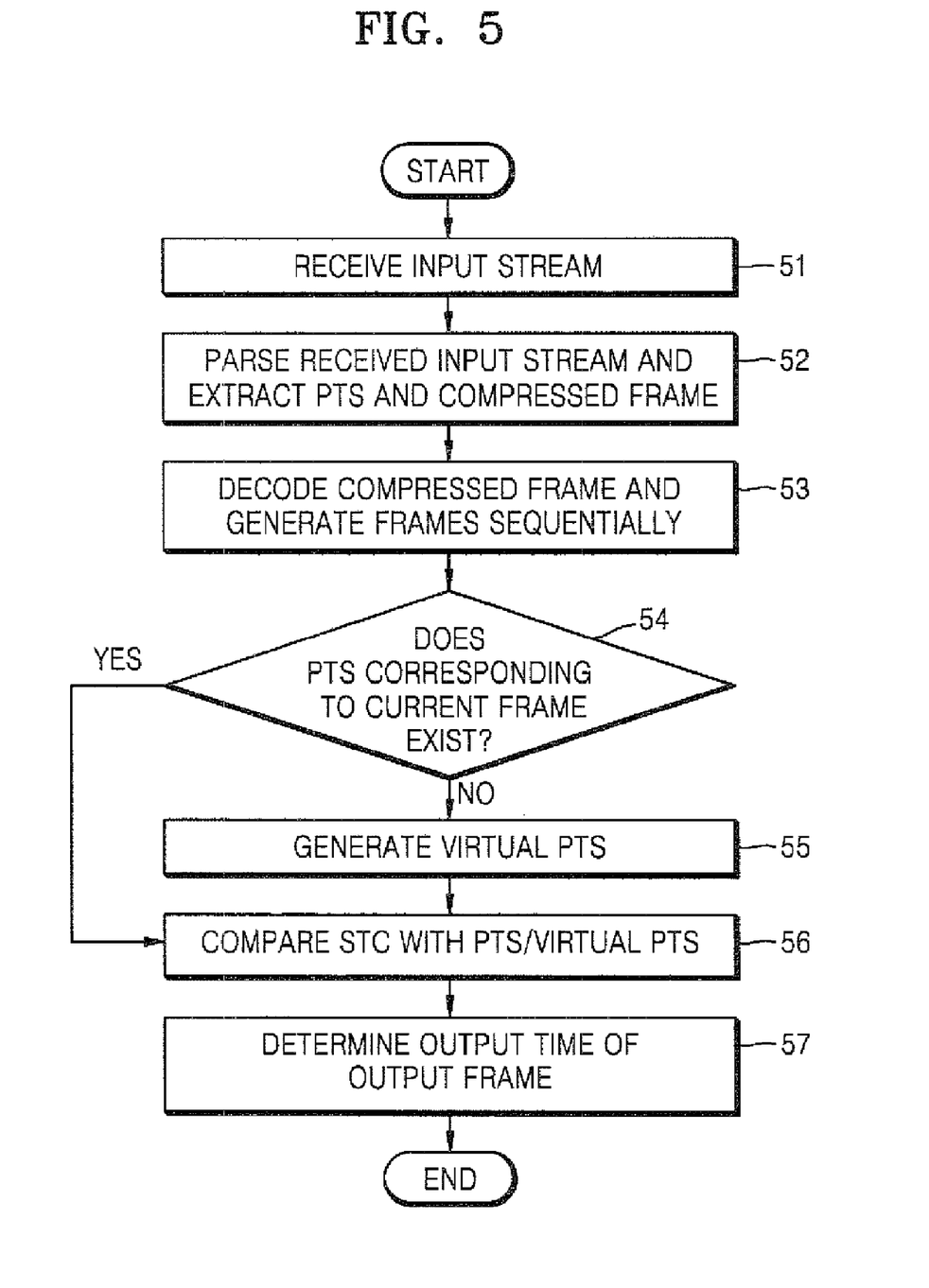
FIG. 5 is a flowchart illustrating a method of reproducing digital broadcasting according to another exemplary embodiment of the present invention.

FIG. 5 is a flowchart illustrating a method of reproducing digital broadcasting according to another exemplary embodiment of the present invention.

Referring to FIG. 5, the method of reproducing digital broadcasting includes receiving an input stream in operation 51. The input stream may be one of a video stream and an audio stream. In addition, the input stream may be structured in the form of PES packets where a transport stream is demultiplexed by being passed through a demultiplexer (not illustrated).

In operation 52, the received input stream is parsed and a PTS and a compressed frame are extracted. More specifically, the PTS is extracted from the input stream, that is a header of the PES packet, and the compressed frame is extracted from an ES where the header is removed from the PES packet. If the input stream is a video stream, the video PTS and the compressed video frame are extracted and if the input stream is an audio stream, the audio PTS and the compressed audio frame are extracted.

In operation 53, the compressed frame is decoded to generate frames sequentially.

In operation 54, whether the PTS corresponding to the current frame exists is determined.

If a PTS corresponding to the current frame does not exist, a VTS is generated based on other extracted PTSs in operation 55. More specifically, the time corresponding to one frame interval is added to the PTS corresponding to the previous output frame to generate the VTS.

A STC is compared with the PTS or the VTS according to a vertical synchronization signal in operation 56. More specifically, if the PTS corresponding to the current frame exists, the STC is compared with the PTS according to a vertical synchronization signal and if the PTS corresponding to the current frame does not exist, the STC is compared with the VTS according to a vertical synchronization signal.

According to the comparison result, the output time of the output frame is determined in operation 57. More specifically, if the difference between the STC and the PTS or the VTS is determined to be smaller than the time T corresponding to one frame interval by comparing the STC with the PTS or the VTS according to the vertical synchronization signal, the frame is normally output. If the difference between the STC and the PTS or the VTS is larger than the time T corresponding to one frame interval, a previous frame is repeatedly output when the STC is smaller than the PTS or the VTS and the frame is skipped and a next one is output when the STC is larger than the PTS or the VTS.

As described above, according to the method and apparatus for reproducing digital broadcasting of the present invention, if the PTS corresponding to the current frame does not exist, the VTS is generated and the STC is compared with the VTS to determine the frame to be displayed, thereby accomplishing AV lip-synchronization.

The present invention is not limited to the exemplary embodiments described above and can be changed by one or ordinary skill in the art.

The invention can also be embodied as computer readable codes on a computer readable recording medium. The computer readable recording medium is any data storage device that can store data which can be thereafter read by a computer system. Examples of the computer readable recording medium include, but are not limited to, read-only memory (ROM), random-access memory (RAM), CD-ROMs, magnetic tapes, hard disks, floppy disks, flash memories, optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of reproducing digital broadcasting, the method comprising:

parsing an input video stream to extract a presentation time stamp (PTS) and a compressed frame;

decoding the extracted compressed frame to generate frames sequentially;

generating and storing a virtual PTS based on the extracted PTS if a PTS corresponding to a current frame does not exist; and comparing the extracted PTS or the virtual PTS with a system time clock (STC) in synchronization with a vertical synchronization signal and determining an output time of a display frame, wherein the generating a virtual PTS comprises adding a time corresponding to one frame interval to the PTS corresponding to a previous display frame.

2. The method of claim 1, wherein the determining an output time of the display frame comprises comparing the STC with the PTS in synchronization with the vertical synchronization signal, if the PTS corresponding to the current frame exists.

3. The method of claim 1, wherein the determining an output time of the display frame comprises comparing the STC with the virtual PTS in synchronization with the vertical synchronization signal, if the PTS corresponding to the current frame does not exist.

4. The method of claim 1, wherein a video frame to be displayed is synchronized with an audio frame to be displayed.

5. A non-transitory readable data storage device having embodied thereon a computer program for causing a computer to execute a method of reproducing digital broadcasting, said program including computer executable instructions for performing steps according to claim 1.

6. The method of claim 2, wherein the determining an output time of the display frame further comprises:
  displaying a frame that corresponds to the PTS if the difference between the STC and the PTS is smaller than the time corresponding to one frame interval;
  repeatedly displaying a previous frame when the STC is smaller than the PTS if the difference between the STC and the PTS is larger than the time corresponding to one frame interval; and
  skipping the frame that corresponds to the PTS and displaying a next frame when the STC is larger than the PTS if the difference between the STC and the PTS is larger than the time corresponding to one frame interval.

7. The method of claim 3, wherein the determining an output time of the display frame further comprises:
  displaying a frame that corresponds to the virtual PTS if the difference between the STC and the virtual PTS is smaller than the time corresponding to one frame interval;
  repeatedly displaying a previous frame when the STC is smaller than the virtual PTS if the difference between the STC and the virtual PTS is larger than the time corresponding to one frame interval; and
  skipping the frame that corresponds to the virtual PTS and displaying a next frame when the STC is larger than the virtual PTS if the difference between the STC and the virtual PTS is larger than the time corresponding to one frame interval.

8. A method of reproducing digital broadcasting, the method comprising:
  parsing an input video stream to extract a presentation time stamp (PTS) and a compressed frame;
  decoding the extracted compressed frame to generate frames sequentially;
  generating and storing a virtual PTS based on the extracted PTS if a PTS corresponding to a current frame does not exist; and
  comparing the extracted PTS or the virtual PTS with a system time clock (STC) in synchronization with a vertical synchronization signal and determining an output time of a display frame,
  wherein the input video stream comprises packetized elementary stream (PES) packets, the PTS exists in a header of the PES packet, and the compressed frame exists in an elementary stream (ES) of the PES packet.

9. An apparatus for reproducing digital broadcasting comprising:
  a parser which parses an input video stream and extracts a presentation time stamp (PTS) and a compressed frame;
  a decoder which decodes the extracted compressed frame and generates frames sequentially; and
  a controlling unit which generates a virtual PTS based on the extracted PTS if a PTS corresponding to a current frame does not exist, and compares the extracted PTS or the virtual PTS with a system time clock (STC) in synchronization with a vertical synchronization signal to determine an output time of a display frame,
  wherein the controlling unit generates the virtual PTS by adding a time corresponding to one frame interval to the PTS corresponding to a previous display frame.

10. The apparatus of claim 9, wherein the controlling unit compares the STC with the PTS in synchronization with the vertical synchronization signal if the PTS corresponding to the current frame exists.

11. The apparatus of claim 9, wherein the controlling unit compares the STC with the virtual PTS in synchronization with the vertical synchronization signal if the PTS corresponding to the current frame does not exist. corresponding to one frame interval when the STC is larger than the virtual PTS.

12. The apparatus of claim 9, wherein the video frame to be displayed is synchronized with an audio frame to be displayed.

13. The apparatus of claim 9, further comprising a storing unit which stores the frame, the extracted PTS, and the virtual PTS.

14. The apparatus of claim 10, wherein the controlling unit displays a frame that corresponds to the PTS if the difference between the STC and the PTS is smaller than the time corresponding to one frame interval, repeatedly displays a previous frame if the difference between the STC and the PTS is larger than the time corresponding to one frame interval when the STC is smaller than the PTS, and skips the frame that corresponds to the PTS and displays a next frame if the difference between the STC and the PTS is larger than the time corresponding to one frame interval when the STC is larger than the PTS.

15. The apparatus of claim 11, wherein the controlling unit displays a frame that corresponds to the virtual PTS if the difference between the STC and the virtual PTS is smaller than the time corresponding to one frame interval, repeatedly displays a previous frame if the difference between the STC and the virtual PTS is larger than the time corresponding to one frame interval when the STC is smaller than the virtual PTS, and skips the frame that corresponds to the virtual PTS and displays a next frame if the difference between the STC and the virtual PTS is larger than the time corresponding to one frame interval when the STC is larger than the virtual PTS.

16. An apparatus for reproducing digital broadcasting comprising:
  a parser which parses an input video stream and extracts a presentation time stamp (PTS) and a compressed frame;
  a decoder which decodes the extracted compressed frame and generates frames sequentially; and
  a controlling unit which generates a virtual PTS based on the extracted PTS if a PTS corresponding to a current frame does not exist, and compares the extracted PTS or the virtual PTS with a system time clock (STC) in synchronization with a vertical synchronization signal to determine an output time of a display frame,
  wherein the input video stream comprises packetized elementary stream (PES) packets, the PTS exists in a header of the PES packet, and the compressed frame exists in an elementary stream (ES) of the PES packet.

17. A method of reproducing digital broadcasting comprising:

parsing an input stream to extract a presentation time stamp (PTS) and a compressed frame and decoding the extracted compressed frame to generate frames sequentially;

generating and storing a virtual PTS based on other extracted PTSs if a PTS corresponding to a current frame does not exist; and comparing the extracted PTS or the virtual PTS with a system time clock (STC) in synchronization with a vertical synchronization signal and determining an output time of a display frame, wherein the generating a virtual PTS comprises adding a time corresponding to one frame interval to the PTS corresponding to a previous display frame.

18. A non-transitory readable data storage device having embodied thereon a computer program for causing a computer to execute a method of reproducing digital broadcasting, said program including computer executable instructions for performing steps according to claim 17.

19. The method of claim 17, wherein the input stream is one of a video stream and an audio stream.

20. A method of reproducing digital broadcasting comprising:

parsing an input stream to extract a presentation time stamp (PTS) and a compressed frame and decoding the extracted compressed frame to generate frames sequentially;

generating and storing a virtual PTS based on other extracted PTSs if a PTS corresponding to a current frame does not exist; and comparing the extracted PTS or the virtual PTS with a system time clock (STC) in synchronization with a vertical synchronization signal and determining an output time of a display frame, wherein the input stream comprises packetized elementary stream (PES) packets, the PTS exists in a header of the PES packet, and the compressed frame exists in elementary stream (ES) of the PES packet.

21. An apparatus for reproducing digital broadcasting comprising:

a demultiplexer which demultiplexer an input transport stream and outputs an audio stream and a video stream;

an audio decoding unit which parses the audio stream to extract an audio presentation time stamp (PTS) and a compressed audio frame and decodes the extracted compressed audio frame to generate audio frames sequentially;

a video decoding unit which parses the video stream to extract a video PTS and a compressed video frame and decodes the extracted compressed video frame to generate video frames sequentially;

an audio controlling unit which generates a virtual audio PTS based on extracted audio PTSs, if a audio PTS corresponding to a current audio frame does not exist, and compares the extracted audio PTS or the virtual audio PTS with a system time clock (STC) in synchronization with a vertical synchronization signal to determine an output time of an output audio frame; and a video controlling unit which generates a virtual video PTS based on extracted video PTSs, if a video PTS corresponding to a current a video frame does not exist, and compares the extracted video PTS or the virtual video PTS with the STC in synchronization with the vertical synchronization signal to determine an output time of an output video frame.

22. The apparatus of claim 21, further comprising:

an audio storing unit which stores the audio frame, the extracted audio PTS, and the virtual audio PTS; and a video storing unit which stores the video frame, the extracted video PTS, and the virtual video PTS.

23. The apparatus of claim 21, wherein the audio controlling unit generates the virtual audio PTS by adding a time corresponding to one audio frame interval to the audio PTS corresponding to a previous output audio frame and the video controlling unit generates the virtual video PTS by adding a time corresponding to one video frame interval to the video PTS corresponding to a previous output video frame.

24. The apparatus of claim 21, wherein the audio and video streams comprise packetized elementary stream (PES) packets, the audio and video PTSs exist in a header of the PES packets, and the compressed audio and video frames exist in, elementary streams (ES) of the PES packets.

* * * * *